United States Patent [19]

Rosenberg

[11] Patent Number: 4,679,914
[45] Date of Patent: Jul. 14, 1987

[54] MICROSCOPE SLIDE WITH TOP AND BOTTOM MARKING SURFACES

[75] Inventor: H. James Rosenberg, Wellesley, Mass.

[73] Assignee: Erie Scientific Company, Portsmouth, N.H.

[21] Appl. No.: 871,144

[22] Filed: Jun. 2, 1986

Related U.S. Application Data

[63] Continuation of Ser. No. 775,704, Sep. 13, 1985, abandoned, which is a continuation of Ser. No. 617,400, Jun. 5, 1985, abandoned.

[51] Int. Cl.$^4$ .............................................. G02B 21/34
[52] U.S. Cl. ................................. 350/534; 428/210
[58] Field of Search ............... 350/534, 533; 356/244; 428/210

[56] References Cited

U.S. PATENT DOCUMENTS

| | | | |
|---|---|---|---|
| 1,241,354 | 9/1917 | Donald | 350/534 |
| 3,481,659 | 12/1969 | Rosenberg | 350/535 |
| 3,498,860 | 3/1970 | Pickett | 350/534 |
| 4,481,246 | 11/1984 | Melisz et al. | 350/534 |

OTHER PUBLICATIONS

*Science*, Apr. 1, 1955, vol. 121, No. 3144, pp. 474–475.

Primary Examiner—Jon W. Henry
Attorney, Agent, or Firm—Marjama & Pincelli

[57] ABSTRACT

A microscope slide having on one side a raised marking surface formed of pigmented resinous material, such as an epoxy resin, which dries to a matte finish which is absorptive and retentive of marking ink, and on the other side, behind the raised marking surface, a frosted marking surface.

10 Claims, 3 Drawing Figures

MICROSCOPE SLIDE WITH TOP AND BOTTOM MARKING SURFACES

This is a continuation, of application Ser. No. 775,704, filed Sept. 13, 1985, now abandoned, which is a continuation of Ser. No. 617,400, filed June 5, 1985, now abandoned.

BACKGROUND AND SUMMARY OF THE INVENTION

This invention relates to a microscope slide and more particularly to one having a coated portion providing a raised marking or writing surface on one side and a "frosted" marking surface on the other side.

Typical microscope slides of the prior art include a frosted portion as a marking surface. This frosted area is created by sandblasting, acid etching, mechanical abrading, or other method of roughening the surface of the glass so that a permanent marking surface is created to accept marking by pen, pencil, or other marking instrument. These techniques create a frosted surface by removing material from the glass surface, therefore necessarily resulting in a marking surface which is recessed from, or certainly no higher than, the surface of the glass slide. Furthermore, such frosted glass, while providing the matte surface on the glass, does not result in a marking surface having a pronounced background to contrast with information to be written thereon.

"Double frosted" or "double etched" slides, having such marking surfaces on both sides are also known to the prior art.

The prior art now also includes slides having a marking surface formed of a coating of resinous material which is porous to make it receptive to marking and pigmented to enhance visibility of such marking. A slide of this type is disclosed and claimed in U.S. Pat. No. 4,481,246.

It is an object of this invention to provide a microscope slide having on one side a raised resinous marking surface which is absorptive and receptive to marking materials, which is pigmented to provide a visual contrast to such marking surface, which is resistant to a variety of laboratory solvents, reagents, stains or chemicals and which may also be produced in a variety of colors to facilitate color coding, and on the opposite side a frosted marking surface.

DRAWING

DESCRIPTION

Figure 1:
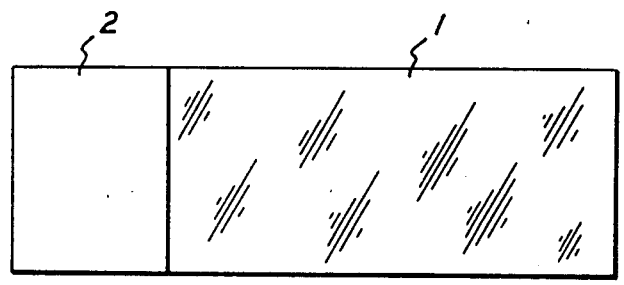
FIG. 1 is a top plan view of the microscope slide according to this invention.
Figure 2:
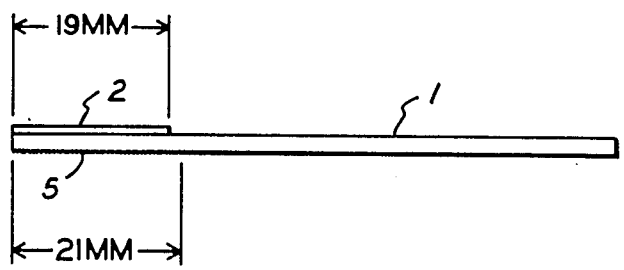
FIG. 2 is a front elevation view of the slide shown in FIG. 1.

Referring to FIGS. 1 and 2, a glass microscope slide is shown at 1, having conventional length, width and thickness. On a top portion or portions thereof, the left end as shown in the drawing, is added a coating 2 of an epoxy or other resinous material which dries to a moth finish, this coating 2 having a finite thickness and therefore providing a raised surface relative to the surface of the glass slide. Behind the resin coating 2, on the bottom of the slide, is a frosted portion 5, formed by sandblasting, acid etching, or mechanical abrading.

The epoxy coating 2 applied to the glass slide includes a pigment to give it a bright contrasting background (e.g. white or various colors) to receive marking and therefore to provide good visibility to any markings placed thereon. The epoxy or other resinous material also includes a granular medium to impart porosity and a permanent matte finish to the coating for accepting marking to individually identify the final use of the slide. This coating accepts the marking of all commonly used laboratory marking instruments, such as felt-tip marking pens, india ink, ballpoint pen, and pencil. The coating forms an absorptive surface capable of holding and retaining the marking, through laboratory procedures in which laboratory solvents and chemicals are commonly used, as well as or better than glass frosted surfaces, depending on the characteristics of the marking device. The raised coating also provides an effective mechanical barrier to liquid flow of specimen in the direction of the coating.

The frosted surface 5 provides an additional marking surface with the added advantage that the opacity of the raised marking surface 2 on the top of the slide imparts its visual contrast to the underside frosting 5, giving it contrast far superior to that on conventional frosted slides.

The use of conventional etching or frosting 5 on the bottom side is less costly than would be the application of a second raised resinous coating. It also is more satisfactory because it avoids adding extra thickness. The additional thickness provided by the resinous coating 2 is desirable and beneficial, but two such additions would be superfluous.

The bottom frosted portion 5 may be extended beyond the top raised surface a short distance, say 2 mm, so as to be observable through the glass slide and thus seen by the user as being available for additional marking.

Figure 3:
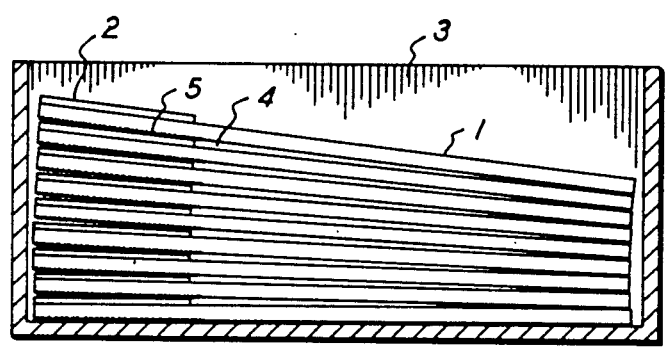
FIG. 3 is representative of a stack of such slides as packaged.

FIG. 3 illustrates an additional benefit to the microscope slides of this invention. When these slides are packaged as in container 3, the finite thickness of the coating 2 provides a small degree of spacing 4 between slides in a stack, thereby avoiding mechanical contact of one surface on another. This eliminates or reduces abrasion between the slides and sticking of one slide on another. A cleaner scratch-free and more easily handled slide results.

It will be appreciated that the relative dimensions of glass slide 1 and coating 2 in the drawing are exaggerated for the sake of illustration.

The raised surface provided by the coating 2 is typically about 0.0003" to 0.0008" thick.

What is claimed is:

1. A microscope slide having a top and bottom surface, said top surface having at least one opaque marking surface located at one end of said slide formed by a coating of a resinous material having a permanent matte finish for accepting a marking, said resinous material including a granular medium, said bottom surface having a frosted surface substantially behind said first marking surface for providing a second marking surface.

2. A microscope slide having a top surface and a bottom surface, said top surface at least one opaque marking surface located at one end formed by a coating of a resinous material which dries to a permanent matte finish for accepting a marking, said resinous material including a granular medium and a pigment, said bottom surface of said slide having a frosted surface for providing a second marking surface substantially behind said first marking surface.

3. A microscope slide according to claim 2 wherein said second marking surface extends beyond said first marking surface a short distance so as to be observable through said slide.

4. A microscope slide comprising:

a flat glass plate having a raised portion at one end thereof, whereby a plurality of such slides are stackable without extended area contact between them for substantially scratch-free packaging, said raised portion providing a first opaque marking surface on the top of said slide and being formed of a coating of an organic resinous material on said glass plate, said resinous material including a granular medium to import porosity to said coating and a pigment to provide visual contrast to said coating to enhance visibility of marking to be placed thereon, said raised portion being effective to provide a barrier to prevent the spread of a liquid sample, placed on said slide, onto said marking surface, and a frosted surface on the bottom of said slide disposed substantially behind said first marking surface to provide a second marking surface.

5. A microscope slide as defined in claim 4 in which said second marking surface extends beyond said first marking surface a short distance so as to be visible through said slide.

6. A microscope slide as defined in claim 4 in which said resinous material is an epoxy resin.

7. A microscope slide according to claim 5 wherein said second marking surface extends beyond said first marking surface a distance of about 2 millimeters.

8. A microscope slide according to claim 7 wherein said frosted surface extends beyond said opaque marking surface a short distance so as to be observable through said slide.

9. A microscope slide according to claim 8 wherein said second marking surface extends beyond said first marking surface a distance of about 2 millimeters.

10. A miroscope slide according to claim 7 wherein said frosted surface extends beyond said opaque marking surface a distance of about 2 millimeters observable through the glass slide.

* * * * *